(12) United States Patent
Keipert

(10) Patent No.: US 12,202,099 B2
(45) Date of Patent: Jan. 21, 2025

(54) COATED ABRASIVE ARTICLE HAVING ROTATIONALLY ALIGNED FORMED CERAMIC ABRASIVE PARTICLES AND METHOD OF MAKING

(71) Applicant: 3M INNOVATIVE PROPERTIES COMPANY, St. Paul, MN (US)

(72) Inventor: Steven J. Keipert, Houlton, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 72 days.

(21) Appl. No.: 15/700,869

(22) Filed: Sep. 11, 2017

(65) Prior Publication Data

US 2017/0368667 A1    Dec. 28, 2017

Related U.S. Application Data

(63) Continuation of application No. 13/983,012, filed as application No. PCT/US2012/023477 on Feb. 1, 2012, now Pat. No. 9,776,302.

(60) Provisional application No. 61/443,418, filed on Feb. 16, 2011.

(51) Int. Cl.
*B24D 3/00* (2006.01)
*B24D 3/28* (2006.01)
*C09K 3/14* (2006.01)

(52) U.S. Cl.
CPC .............. *B24D 3/004* (2013.01); *B24D 3/28* (2013.01); *C09K 3/1409* (2013.01); *B24D 2203/00* (2013.01)

(58) Field of Classification Search
CPC .......... B24D 3/28; B24D 3/004; B24D 3/002; B24D 3/344; B24D 3/342; B24D 11/00; B24D 11/02; B24D 11/001; B24B 37/245

USPC ...... 51/295, 298, 20, 50; 451/529, 539, 526, 451/41

See application file for complete search history.

(56) References Cited

U.S. PATENT DOCUMENTS

| | | |
|---|---|---|
| 1,910,444 A | 5/1933 | Nicholson |
| 2,370,636 A | 3/1945 | Carlton |
| 2,820,746 A | 1/1958 | Keeleric |
| 3,041,156 A | 6/1962 | Rowse |
| 4,799,939 A | 1/1989 | Bloecher |
| 4,930,266 A * | 6/1990 | Calhoun .............. B24D 11/001 51/293 |

(Continued)

FOREIGN PATENT DOCUMENTS

| | | |
|---|---|---|
| CA | 2 085 622 | 7/1993 |
| CN | 1623731 | 6/2005 |

(Continued)

OTHER PUBLICATIONS

International Search Report for PCT International Application No. PCT/US2012/023477, Mailed Aug. 24, 2012, 4 pages.

*Primary Examiner* — Robert F Neibaur

(57) ABSTRACT

A coated abrasive article having a plurality of formed ceramic abrasive particles each having a surface feature. The plurality of formed ceramic abrasive particles attached to a flexible backing by a make coat comprising a resinous adhesive forming an abrasive layer. The surface feature having a specified z-direction rotational orientation, and the specified z-direction rotational orientation occurs more frequently in the abrasive layer than would occur by a random z-direction rotational orientation of the surface feature.

20 Claims, 8 Drawing Sheets

(56) References Cited

U.S. PATENT DOCUMENTS

| | | | |
|---|---|---|---|
| 4,997,461 A | 3/1991 | Markhoff-Matheny | |
| 5,009,675 A | 4/1991 | Kunz | |
| 5,011,508 A | 4/1991 | Wald | |
| 5,042,991 A | 8/1991 | Kunz | |
| 5,078,753 A | 1/1992 | Broberg | |
| 5,085,671 A | 2/1992 | Martin | |
| 5,201,916 A * | 4/1993 | Berg | B24D 3/14 264/6 |
| 5,213,591 A | 5/1993 | Celikkaya | |
| 5,366,523 A | 11/1994 | Rowenhorst | |
| 5,372,620 A | 12/1994 | Rowse | |
| 5,453,106 A | 9/1995 | Roberts | |
| 5,492,548 A | 2/1996 | Wasikowski | |
| RE35,570 E | 7/1997 | Rowenhorst | |
| 5,669,941 A | 9/1997 | Peterson | |
| 5,851,247 A | 12/1998 | Stoetzel | |
| 5,958,794 A * | 9/1999 | Bruxvoort | B24B 7/228 438/692 |
| 5,984,988 A | 11/1999 | Berg | |
| 6,371,842 B1 | 4/2002 | Romero | |
| 6,669,745 B2 * | 12/2003 | Prichard | B24D 3/002 51/293 |
| 6,945,857 B1 * | 9/2005 | Doan | B24B 53/017 451/443 |
| 7,297,170 B2 * | 11/2007 | Welygan | B01J 2/26 451/529 |
| 7,553,346 B2 | 6/2009 | Welygan | |
| 7,618,306 B2 * | 11/2009 | Felipe, Sr. | B24D 13/14 451/28 |
| 2002/0026752 A1 | 3/2002 | Culler | |
| 2003/0009949 A1 * | 1/2003 | Prichard | B24D 3/002 51/297 |
| 2003/0213182 A1 | 11/2003 | Knapp | |
| 2004/0018802 A1 * | 1/2004 | Welygan | B24D 3/002 451/28 |
| 2004/0072510 A1 * | 4/2004 | Kinoshita | B24B 53/017 451/548 |
| 2006/0010780 A1 | 1/2006 | Hall | |
| 2007/0037500 A1 * | 2/2007 | Minick | B24D 11/008 451/533 |
| 2007/0093181 A1 * | 4/2007 | Lugg | B24D 11/001 451/41 |
| 2009/0145045 A1 * | 6/2009 | Sung | B24D 18/0009 51/293 |
| 2009/0165394 A1 * | 7/2009 | Culler | B01J 2/22 51/296 |
| 2009/0169816 A1 | 7/2009 | Erickson | |
| 2010/0146867 A1 | 6/2010 | Boden | |
| 2010/0151195 A1 * | 6/2010 | Culler | C09K 3/1409 428/142 |
| 2010/0151196 A1 | 6/2010 | Adefris | |
| 2010/0151201 A1 | 6/2010 | Erickson | |
| 2010/0319269 A1 * | 12/2010 | Erickson | B24D 11/00 51/295 |
| 2011/0092137 A1 | 4/2011 | Ohishi | |

FOREIGN PATENT DOCUMENTS

| | | |
|---|---|---|
| CN | 2015/16579 U | 6/2010 |
| EP | 1 459 847 | 9/2004 |
| EP | 1 995 020 | 11/2008 |
| WO | WO 1994/07809 | 4/1994 |
| WO | WO 98/010896 | 3/1998 |
| WO | 2007032946 A2 | 3/2007 |
| WO | WO 2007/146608 | 12/2007 |
| WO | WO 2011/068714 | 6/2011 |
| WO | WO 2011/087649 | 7/2011 |
| WO | WO 2011/139562 | 11/2011 |
| WO | WO 2012/018903 | 2/2012 |
| WO | WO 2012/112322 | 8/2012 |

* cited by examiner

FIG. 4A  FIG. 4B

COATED ABRASIVE ARTICLE HAVING ROTATIONALLY ALIGNED FORMED CERAMIC ABRASIVE PARTICLES AND METHOD OF MAKING

CROSS REFERENCE TO RELATED APPLICATIONS

This application is a continuation of Ser. No. 13/983,012 filed on Sep. 5, 2013, allowed, which is a national stage filing under 35 U.S.C. § 371 of PCT/US2012/023477, filed Feb. 1, 2012, which claims priority to U.S. Provisional Patent Application No. 61/443,418, filed Feb. 16, 2011, the disclosures of which are incorporated by reference in their entirety herein.

BACKGROUND

Abrasive particles and abrasive articles made from the abrasive particles are useful for abrading, finishing, or grinding a wide variety of materials and surfaces in the manufacturing of goods. As such, there continues to be a need for improving the cost, performance, or life of the abrasive particle and/or the abrasive article.

Triangular shaped abrasive particles and abrasive articles using the triangular shaped abrasive particles are disclosed in U.S. Pat. No. 5,201,916 to Berg; U.S. Pat. No. 5,366,523 to Rowenhorst; and U.S. Pat. No. 5,984,988 to Berg. In one embodiment, the abrasive particles' shape comprised an equilateral triangle. Triangular shaped abrasive particles are useful in manufacturing abrasive articles having enhanced cut rates.

SUMMARY

Shaped abrasive particles, in general, can have superior performance over randomly crushed abrasive particles. By controlling the shape of the abrasive particle it is possible to control the resulting performance of the abrasive article. The inventors have discovered that by further controlling the shaped abrasive particles' z-direction rotational orientation, the cut and finish of the resulting coated abrasive article can be altered.

Coated abrasive articles are conventionally made by electrostatic coating (e-coat) the abrasive particles onto a make layer on a backing or drop coating the abrasive particles onto the make layer. Controlling the z-direction rotational orientation of abrasive particles in a coated abrasive article is not possible using conventional electrostatic deposition methods to propel the abrasive grain vertically against the force of gravity onto a make layer by use of an electrostatic field thereby erectly applying the abrasive particles as shown in U.S. Pat. No. 2,370,636. The adhered abrasive particles to the make layer will have a random z-direction rotational orientation since the particle's rotation as it is being removed from the conveyor belt by the electrostatic field is random and uncontrolled. Similarly, in drop coated abrasive articles, the particle's z-direction rotational orientation is random as the particles are fed from the hopper and fall by the force of gravity onto the make layer.

During the manufacture of rigid abrasive tools, employing a metal bond and diamond abrasive particles, screens can be used to apply the diamond abrasive particles to a rigid support, such a metal disc, in a particular pattern or gird. However, the diamonds in general are not orientated to have any specific z-direction rotational orientation and the screen apertures are such that the diamond is free to rotate in any direction when being placed into the screen aperture. Sometimes the diamonds are oriented with respect to their internal crystallographic direction of maximum hardness as discussed in U.S. Pat. No. 5,453,106; but it has been heretofore unappreciated to rotationally align formed ceramic abrasive particles with regard to a surface feature of the particle to either increase the cut or alter the resulting finish.

The inventors have discovered that the use of precision screens having precisely spaced and aligned non-circular apertures to hold an individual abrasive particle in a fixed position can be used to rotationally align a surface feature of the abrasive particles in a specific z-direction rotational orientation. Alignment of the surface feature can be used to enhance the cutting action of that surface feature or to change the finish produced on the workpiece by the surface feature.

Furthermore, the precision screens can be used to control the density of the abrasive particles without requiring any specific rotational orientation by creating a pre-determined pattern with the abrasive particles in the abrasive layer. These patterns can achieve significantly more "vertex up" placement of the triangular formed abrasive particles on the coated backing than electrostatic coating methods can achieve; especially, at higher densities of the formed abrasive particles on the coated backing.

Additionally, an engineered abrasive layer having a pre-determined pattern can be constructed where the spacing in the x and y directions along with the z-direction rotational orientation of the abrasive particles about a z-axis passing through the backing and the abrasive particle is controlled.

Hence, in one embodiment, the invention resides in a coated abrasive article comprising: a plurality of formed ceramic abrasive particles each having a surface feature; the plurality of formed ceramic abrasive particles attached to a flexible backing by a make coat comprising a resinous adhesive forming an abrasive layer; the surface feature having a specified z-direction rotational orientation; and wherein the specified z-direction rotational orientation occurs more frequently in the abrasive layer than would occur by a random z-direction rotational orientation of the surface feature.

BRIEF DESCRIPTION OF THE DRAWING

It is to be understood by one of ordinary skill in the art that the present discussion is a description of exemplary embodiments only, and is not intended as limiting the broader aspects of the present disclosure, which broader aspects are embodied in the exemplary construction.

FIGS. 2A and 2B are top views of one embodiment of coated abrasive articles having z-direction rotationally aligned shaped abrasive particles of FIGS. 1A and 1B.

FIGS. 3A and 3B are top views of another embodiment of coated abrasive articles having z-direction rotationally aligned shaped abrasive particles of FIGS. 1A and 1B.

FIGS. 4A and 4B are top views of another embodiment of coated abrasive articles having z-direction rotationally aligned shaped abrasive particles of FIGS. 1A and 1B.

Figure 1A:
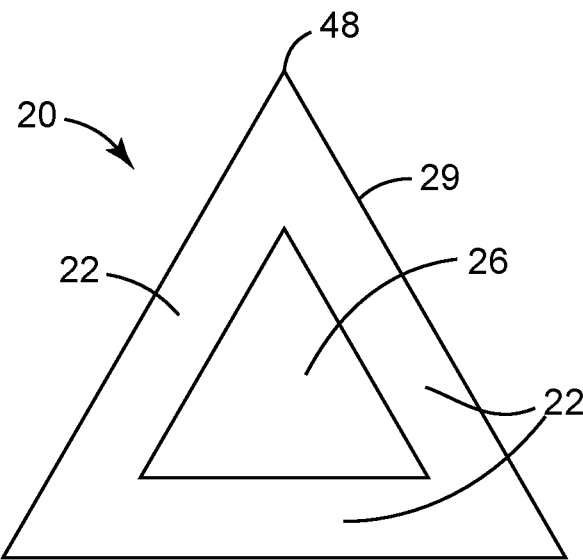
FIGS. 1A and 1B illustrate a top view and a side view of one embodiment of a shaped abrasive particle.

Repeated use of reference characters in the specification and drawings is intended to represent the same or analogous features or elements of the disclosure.

Definitions

As used herein, forms of the words "comprise", "have", and "include" are legally equivalent and open-ended. Therefore, additional non-recited elements, functions, steps or limitations may be present in addition to the recited elements, functions, steps, or limitations.

As used herein, the term "abrasive dispersion" means an alpha alumina precursor that can be converted into alpha alumina that is introduced into a mold cavity. The composition is referred to as an abrasive dispersion until sufficient volatile components are removed to bring solidification of the abrasive dispersion.

As used herein "formed ceramic abrasive particle" means a ceramic abrasive particle having at least a partially replicated shape. Non-limiting processes to make formed abrasive particles include shaping the precursor abrasive particle in a mold having a predetermined shape, extruding the precursor abrasive particle through an orifice having a predetermined shape, printing the precursor abrasive particle though an opening in a printing screen having a predetermined shape, or embossing the precursor abrasive particle into a predetermined shape or pattern. Non-limiting examples of formed ceramic abrasive particles include shaped abrasive particles formed in a mold, such as triangular plates as disclosed in U.S. Pat. Nos. RE 35,570; 5,201,916, and 5,984,998; or extruded elongated ceramic rods/filaments often having a circular cross section produced by Saint-Gobain Abrasives an example of which is disclosed in U.S. Pat. No. 5,372,620. Formed abrasive particle as used herein excludes randomly sized abrasive particles obtained by a mechanical crushing operation.

As used herein, the term "precursor shaped abrasive particle" means the unsintered particle produced by removing a sufficient amount of the volatile component from the abrasive dispersion, when it is in the mold cavity, to form a solidified body that can be removed from the mold cavity and substantially retain its molded shape in subsequent processing operations.

As used herein, the term "shaped abrasive particle", means a ceramic abrasive particle with at least a portion of the abrasive particle having a predetermined shape that is replicated from a mold cavity used to form the shaped precursor abrasive particle. Except in the case of abrasive shards (e.g. as described in U.S. patent publication US 2009/0169816, the shaped abrasive particle will generally have a predetermined geometric shape that substantially replicates the mold cavity that was used to form the shaped abrasive particle. Shaped abrasive particle as used herein excludes randomly sized abrasive particles obtained by a mechanical crushing operation.

As used herein, "z-direction rotational orientation" refers to the particle's angular rotation about a z-axis passing through the particle and through the backing at a 90 degree angle to the backing when the particle is attached to the backing by a make layer.

DETAILED DESCRIPTION

Shaped Abrasive Particle with a Sloping Sidewall

Figure 1B:
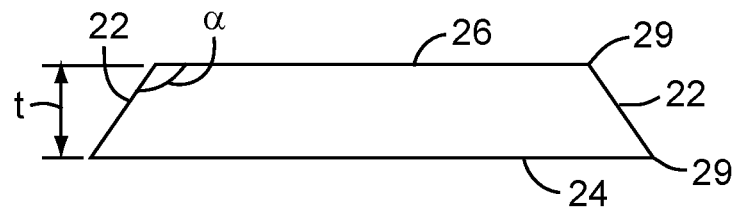
Figure 1C:
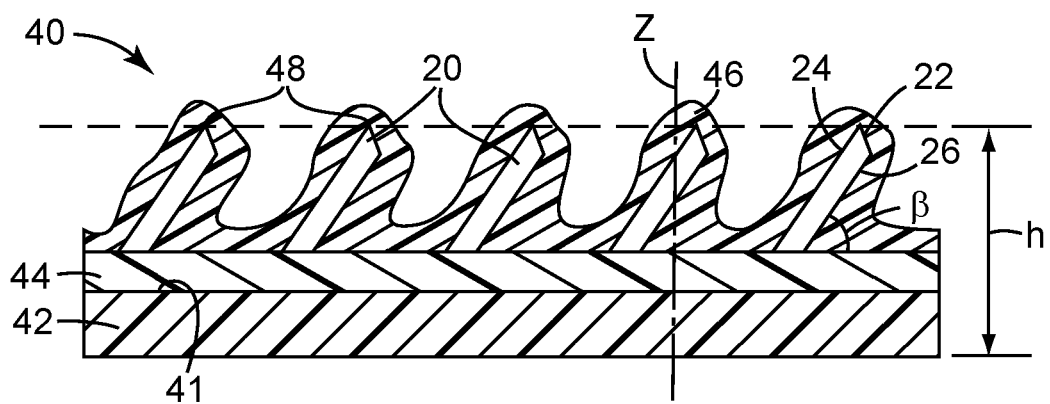
FIG. 1C illustrates a side view of a coated abrasive article.

Referring to FIGS. 1A, 1B, and 1C an exemplary shaped abrasive particle 20 with a sloping sidewall 22 is illustrated. The material from which the shaped abrasive particle 20 with a sloping sidewall 22 is made comprises a ceramic and specifically in one embodiment alpha alumina. Alpha alumina particles can be made from a dispersion of aluminum oxide monohydrate that is gelled, molded to shape, dried to retain the shape, calcined, and then sintered. The shaped abrasive particle's shape is retained without the need for a binder to form an agglomerate comprising abrasive particles in a binder that are then formed into a shaped structure.

In general, the shaped abrasive particles 20 with a sloping sidewall 22 comprise thin bodies having a first face 24, and a second face 26 and having a thickness t. The first face 24 and the second face 26 are connected to each other by at least one sloping sidewall 22. In some embodiments, more than one sloping sidewall 22 can be present and the slope or angle for each sloping sidewall 22 may be the same as shown in FIG. 1A or different.

In some embodiments, the first face 24 is substantially planar, the second face 26 is substantially planar, or both faces are substantially planar. Alternatively, the faces could be concave or convex as discussed in more detail in U.S. patent publication 2010/0151195 entitled "Dish-Shaped Abrasive Particles With A Recessed Surface", filed on Dec. 17, 2008. Additionally, an opening or aperture through the faces could be present as discussed in more detail in U.S. patent publication 2010/0151201 entitled "Shaped Abrasive Particles With An Opening, filed on Dec. 17, 2008.

In one embodiment, the first face 24 and the second face 26 are substantially parallel to each other. In other embodiments, the first face 24 and second face 26 can be nonparallel such that one face is sloped with respect to the other face and imaginary lines tangent to each face would intersect at a point. The sloping sidewall 22 of the shaped abrasive particle 20 with a sloping sidewall 22 can vary and it generally forms the perimeter 29 of the first face 24 and the second face 26. In one embodiment, the perimeter 29 of the first face 24 and second face 26 is selected to be a geometric shape, and the first face 24 and the second face 26 are selected to have the same geometric shape, although, they differ in size with one face being larger than the other face. In one embodiment, the perimeter 29 of first face 24 and the perimeter 29 of the second face 26 was a triangular shape that is illustrated.

Referring to FIGS. 1B and 1C, a draft angle α between the second face 26 and the sloping sidewall 22 of the shaped abrasive particle 20 can be varied to change the relative sizes of each face. In various embodiments of the invention, the draft angle α can be between about 90 degrees to about 130 degrees, or between about 95 degrees to about 130 degrees, or between about 95 degrees to about 125 degrees, or between about 95 degrees to about 120 degrees, or between about 95 degrees to about 115 degrees, or between about 95 degrees to about 110 degrees, or between about 95 degrees to about 105 degrees, or between about 95 degrees to about 100 degrees. As discussed in U.S. patent publication 2010/0151196 entitled "Shaped Abrasive Particles With A Sloping Sidewall" filed on Dec. 17, 2008, specific ranges for the draft angle α have been found to produce surprising increases in the grinding performance of coated abrasive articles made from the shaped abrasive particles with a sloping sidewall.

Referring now to FIG. 1C, a coated abrasive article 40 is shown having a first major surface 41 of a backing 42 covered by an abrasive layer. The abrasive layer comprises a make coat 44, and a plurality of shaped abrasive particles 20 with a sloping sidewall 22 attached to the backing 42 by the make coat 44. A size coat 46 is applied to further attach or adhere the shaped abrasive particles 20 with a sloping sidewall 22 to the backing 42.

As seen, the majority of the shaped abrasive particles 20 with a sloping sidewall 22 are tipped or leaning to one side. This results in the majority of the shaped abrasive particles 20 with a sloping sidewall 22 having an orientation angle β less than 90 degrees relative to the first major surface 41 of the backing 42. As seen, once the shaped abrasive particles with a sloping sidewall are applied and allowed to lean onto the sloping sidewall, the very tips 48 of the shaped abrasive particles have generally the same height, h.

To further optimize the leaning orientation, the shaped abrasive particles with a sloping sidewall can be applied to the backing in an open coat abrasive layer. A closed coat abrasive layer in an electrostatic application system is the maximum weight of abrasive particles or a blend of abrasive particles that can be applied to a make coat of an abrasive article in a single pass through the maker. An open coat is an amount of abrasive particles or a blend of abrasive particles, weighing less than the maximum weight in grams that can be applied, that is applied to a make coat of a coated abrasive article. An open coat abrasive layer will result in less than 100% coverage of the make coat with abrasive particles thereby leaving open areas and a visible resin layer between the particles.

It is believed that if too many of the shaped abrasive particles with a sloping sidewall are applied to the backing, insufficient spaces between the particles will be present to allow for them to lean or tip prior to curing the make and size coats. In various embodiments of the invention, greater than 50, 60, 70, 80, or 90 percent of the shaped abrasive particles in the coated abrasive article having an open or closed coat abrasive layer are tipped or leaning having an orientation angle β of less than 90 degrees. Precision aperture screens can be used to evenly space the shaped abrasive particles while still allowing for them to tip or lean at significantly higher abrasive particle densities in the abrasive layer that approach or equal closed coat densities.

Without wishing to be bound by theory, it is believed that an orientation angle β less than 90 degrees results in enhanced cutting performance of the shaped abrasive particles with a sloping sidewall. In various embodiments of the invention, the orientation angle β for at least a majority of the shaped abrasive particles with a sloping sidewall in an abrasive layer of a coated abrasive article can be between about 50 degrees to about 85 degrees, or between about 55 degrees to about 85 degrees, or between about 60 degrees to about 85 degrees, or between about 65 degrees to about 85 degrees, or between about 70 degrees to about 85 degrees, or between about 75 degrees to about 85 degrees, or between about 80 degrees to about 85 degrees.

The shaped abrasive particles 20 with a sloping sidewall can have various volumetric aspect ratios. The volumetric aspect ratio is defined as the ratio of the maximum cross sectional area passing through the centroid of a volume divided by the minimum cross sectional area passing through the centroid. For some shapes, the maximum or minimum cross sectional area may be a plane tipped, angled, or tilted with respect to the external geometry of the shape. For example, a sphere would have a volumetric aspect ratio of 1.000 while a cube will have a volumetric aspect ratio of 1.414. A shaped abrasive particle in the form of an equilateral triangle having each side equal to length A and a uniform thickness equal to A will have a volumetric aspect ratio of 1.54, and if the uniform thickness is reduced to 0.25A, the volumetric aspect ratio is increased to 2.64. It is believed that shaped abrasive particles having a larger volumetric aspect ratio have enhanced cutting performance. In various embodiments of the invention, the volumetric aspect ratio for the shaped abrasive particles with a sloping sidewall can be greater than about 1.15, or greater than about 1.50, or greater than about 2.0, or between about 1.15 to about 10.0, or between about 1.20 to about 5.0, or between about 1.30 to about 3.0.

Other suitable shaped abrasive particles are disclosed in U.S. patent publication 2009/0169816; U.S. patent publication 2010/0146867; U.S. patent publication 2010/0319269; U.S. patent application 61/266,000 filed on Dec. 2, 2009 entitled "Dual tapered Shaped Abrasive Particles"; U.S. patent application 61/328,482 filed on Apr. 27, 2010 entitled "Ceramic Shaped Abrasive Particles, Method Of Making The Same, And Abrasive Articles Containing The Same"; and U.S. patent application 61/370,497 filed on Aug. 4, 2010 entitled "Intersecting Plate Shaped Abrasive Particles".

Materials that can be made into formed ceramic abrasive particles include physical precursors such as finely divided particles of known ceramic materials such as alpha alumina, silicon carbide, alumina/zirconia and boron carbide. Also included are chemical and/or morphological precursors such as aluminum trihydrate, boehmite, gamma alumina and other transitional aluminas and bauxite. The most useful of the above are typically based on alumina and its physical or chemical precursors. It is to be understood however that the invention is not so limited but is capable of being adapted for use with a plurality of different precursor ceramic materials.

Suitable methods for making formed ceramic abrasive particles are disclosed in: U.S. patent publication 2009/0165394 filed on Dec. 17, 2008 entitled "Method Of Making Abrasive Shards, Shaped Abrasive Particles With An Opening, Or Dish-shaped Abrasive Particles"; U.S. patent application Ser. No. 61/289,188 filed on Dec. 22, 2009 entitled Transfer Assisted Screen Printing Method Of Making Shaped Abrasive Particles And The Resulting Shaped Abrasive Particles; and in the patents referenced in the definition of formed ceramic abrasive particle.

Particles suitable for mixing with the shaped abrasive particles 20 with a sloping sidewall 22 include conventional abrasive grains, diluent grains, or erodable agglomerates, such as those described in U.S. Pat. Nos. 4,799,939 and 5,078,753. Representative examples of conventional abrasive grains include fused aluminum oxide, silicon carbide, garnet, fused alumina zirconia, cubic boron nitride, diamond, and the like. Representative examples of diluent grains include marble, gypsum, and glass. Blends of differently shaped abrasive particles 20 with a sloping sidewall 22 (triangles and squares for example) or blends of shaped abrasive particles 20 with different draft angles (for example particles having an 98 degree draft angle mixed with particles having a 120 degree draft angle) can be used in abrasive articles.

The shaped abrasive particles 20 with a sloping sidewall 22 may also have a surface coating. Surface coatings are known to improve the adhesion between abrasive grains and the binder in abrasive articles or can be used to aid in electrostatic deposition of the shaped abrasive particles 20. Such surface coatings are described in U.S. Pat. Nos. 5,213,591; 5,011,508; 1,910,444; 3,041,156; 5,009,675; 5,085,671; 4,997,461; and 5,042,991. Additionally, the surface coating may prevent the shaped abrasive particle from capping. Capping is the term to describe the phenomenon where metal particles from the workpiece being abraded become welded to the tops of the shaped abrasive particles. Surface coatings to perform the above functions are known to those of skill in the art.

Coated Abrasive Article Having Z-Direction Rotationally Aligned Abrasive Particles Referring to FIG. 1C, a coated abrasive article 40 comprises a backing 42 having a first layer of binder, hereinafter referred to as the make coat 44, applied over a first major surface 41 of backing 42. Attached or partially embedded in the make coat 44 are a plurality of formed ceramic abrasive particles which, in one embodiment, comprises shaped abrasive particles 20 with a sloping sidewall 22 forming an abrasive layer. Over the shaped abrasive particles 20 with a sloping sidewall 22 is a second layer of binder, hereinafter referred to as the size coat 46. The purpose of make coat 44 is to secure shaped abrasive particles 20 with the sloping sidewall 22 to backing 42 and the purpose of size coat 46 is to reinforce shaped abrasive particles 20 with a sloping sidewall 22. The majority of the shaped abrasive particles 20 with a sloping sidewall 22 are oriented such that the tip 48 or vertex points away from the backing 42 and the shaped abrasive particles are resting on the sloping sidewall 22 and tipped or leaning as shown.

Figure 5A:
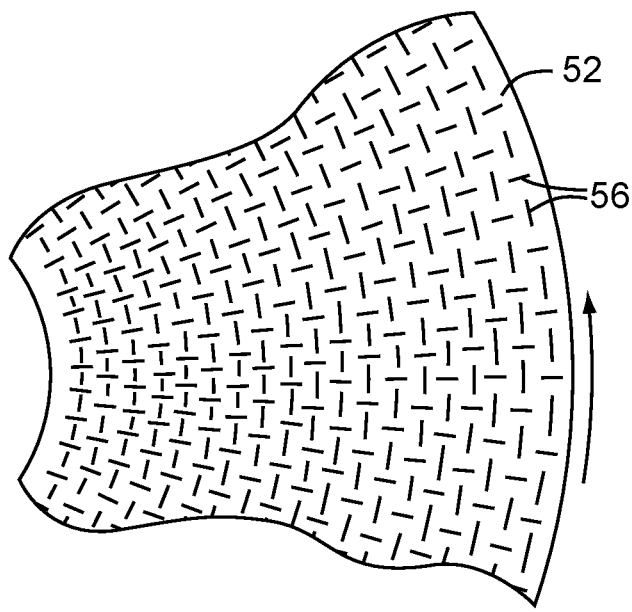
FIGS. 5A and 5B are top views of another embodiment of coated abrasive articles having z-direction rotationally aligned shaped abrasive particles of FIGS. 1A and 1B.
Figure 5B:
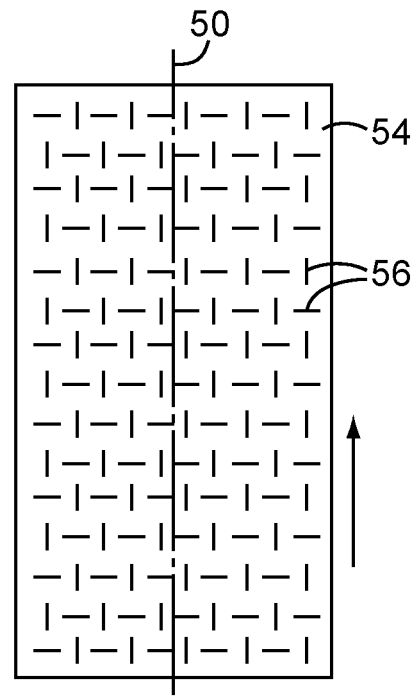

Each of the plurality of formed ceramic abrasive particles can have a specified z-direction rotational orientation about a z-axis passing through the formed ceramic abrasive particle and through the backing 42 at a 90 degree angle to the backing as shown in FIG. 1C. The formed abrasive particles are orientated with a surface feature, such as a substantially planar surface of the first face 24 or the second face 26, rotated into a specified angular position about the z-axis. The specified z-direction rotational orientation in the coated abrasive article occurs more frequently than would occur by a random z-directional rotational orientation of the surface feature due to electrostatic coating or drop coating of the formed abrasive particles when forming the abrasive layer. As such, by controlling the z-direction rotational orientation of a significantly large number of the formed ceramic abrasive particles, the cut rate, finish, or both of the coated abrasive article can be varied from those manufactured using an electrostatic coating method. In various embodiments of the invention, at least 50, 51, 55, 60, 65, 70, 75, 80, 85, 90, 95, or 99 percent of the formed ceramic abrasive particles in the abrasive layer can have a specified z-direction rotational orientation which does not occur randomly and which can be substantially the same for all of the aligned particles. In other embodiments, about 50 percent of the formed ceramic abrasive particles can be aligned in a first direction and about 50 percent of the formed ceramic abrasive particles can be aligned in a second direction (FIGS. 5A, 5B). In one embodiment, the first direction is substantially orthogonal to the second direction.

The surface feature is formed during the molding, extrusion, screen printing or other process that shapes the formed ceramic abrasive particle. Non-limiting surface features can include: a substantially planer surface; a substantially planar surface having a triangular, rectangular, hexagonal, or polygonal perimeter; a concave surface; a convex surface; a vertex; an aperture; a ridge; a line or a plurality of lines; a protrusion; or a depression. The surface feature is often chosen to change the cut rate, reduce wear of the formed abrasive particles, or change the resulting finish. Often, the surface feature will be an edge, a plane, or a point and the z-direction rotational orientation of that feature in the abrasive layer will be selected taking into consideration the motion of the abrasive layer, the motion of the work piece, and the angle of the abrasive layer relative to the workpiece surface during grinding.

Referring now to FIGS. 2A, 2B through 5A, 5B; various patterns of the formed ceramic abrasive particles in the abrasive layer of coated abrasive discs, sheets, or belts are illustrated. The illustrations represent top views of the abrasive layer having a plurality of shaped abrasive particles as shown in FIGS. 1A, B. For simplicity, each individual shaped abrasive particle is represented as a short line segment representative of the position of the base (sloping sidewall) of the shaped abrasive particle attached to the make coat. In the illustrations representative of a sheet or belt, a longitudinal axis 50 is drawn for reference. Arrows indicating the disc's or belt's direction of travel when placed onto grinding tool are additionally provided.

Figure 2C:
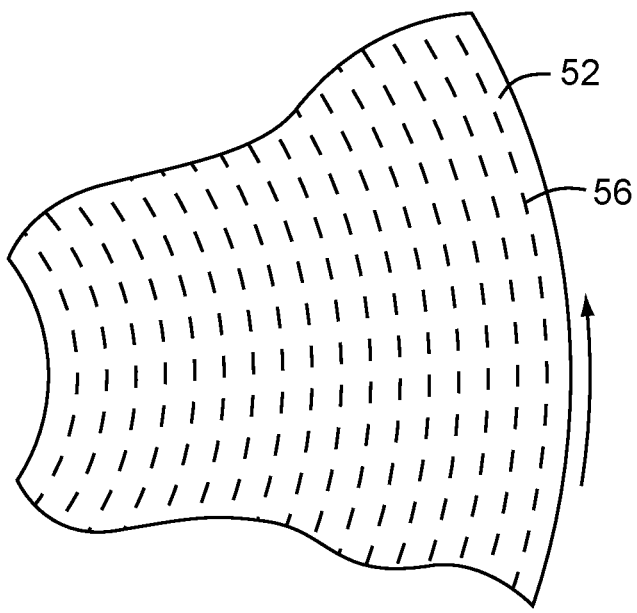
FIG. 2C is a top view of a portion of a screen having a plurality of rotationally aligned apertures used to make the coated abrasive article of FIG. 2A.
Figure 2C:
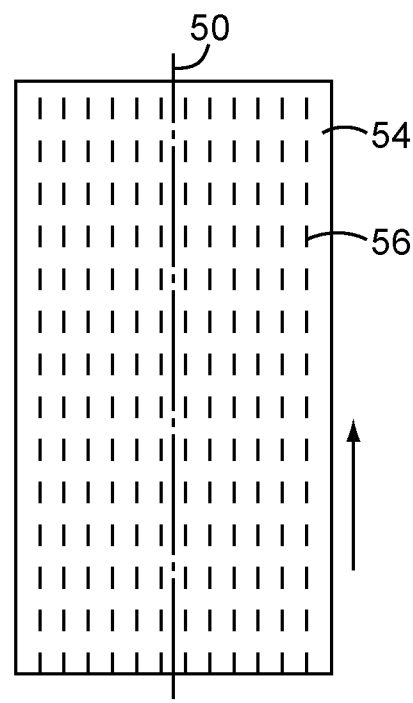
Figure 2C:
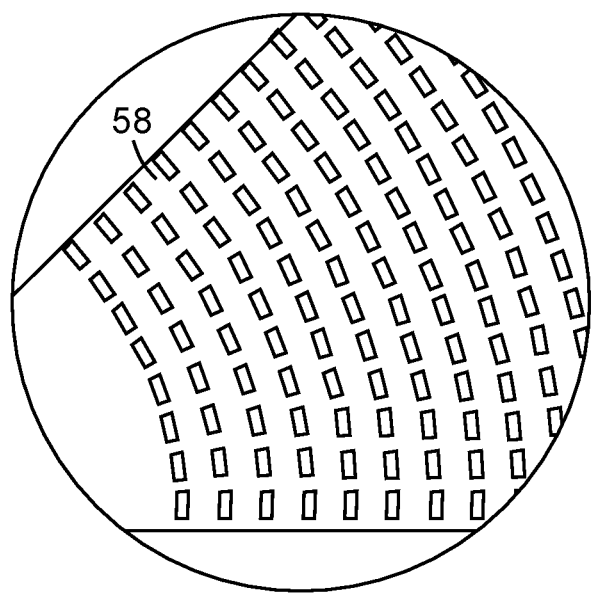

Referring now to FIGS. 2A, 2B, the coated abrasive article can comprise a disc 52 or a sheet 54 or a belt 54. In FIG. 2A the coated abrasive article is a disc and the specified z-direction rotational orientation positions the substantially planar surface 56 circumferentially and the pattern created by the plurality of formed ceramic abrasive particles comprises a plurality of concentric circles. In FIG. 2B, the coated abrasive article is a sheet 54 or a belt 54 and the specified z-direction rotational orientation positions the substantially planar surface 56 at an angle of approximately 0 degrees to the longitudinal axis 50 of the belt or the sheet and the pattern created by the plurality of formed ceramic abrasive particles comprises a plurality of parallel lines. Referring to FIG. 2C, the precision apertured screen 58 for precisely placing and rotationally aligning the formed abrasive particles when making the disc in FIG. 2A is shown.

Figure 3C:
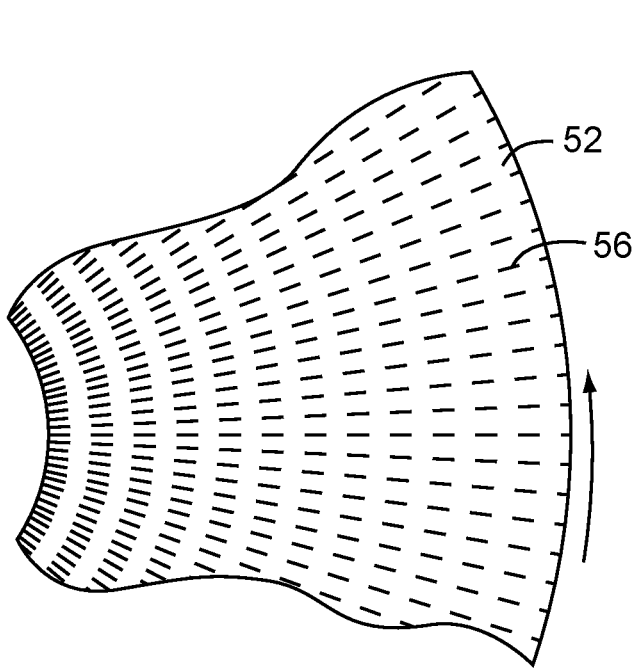
FIG. 3C is a top view of a portion of a screen having a plurality of rotationally aligned apertures used to make the coated abrasive articles of FIG. 3A.
Figure 3C:
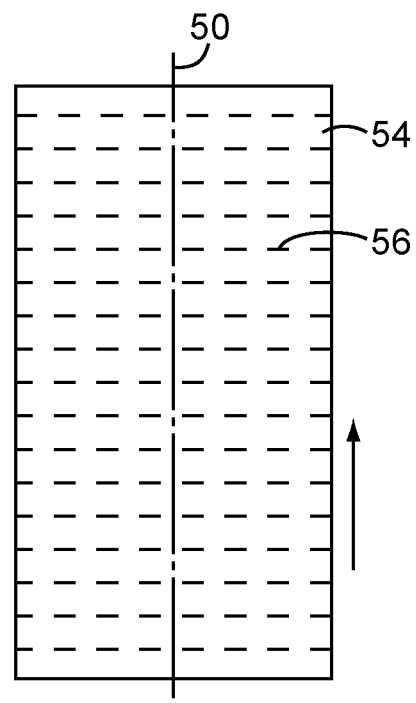
Figure 3C:
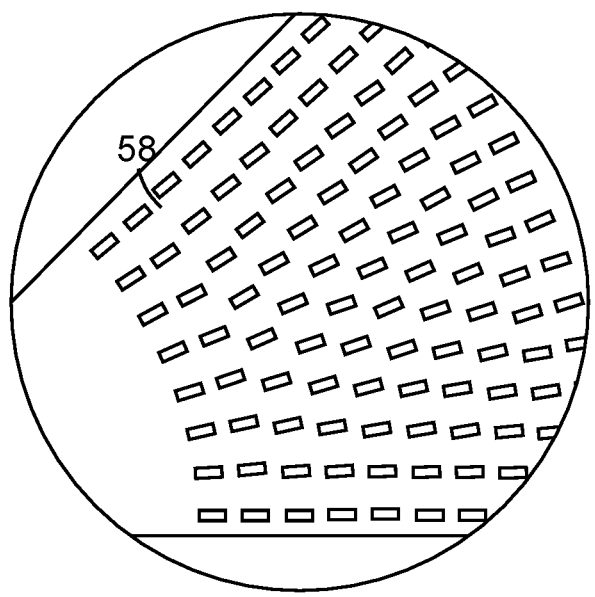

Referring now to FIGS. 3A, 3B, the coated abrasive article can comprise a disc 52 or a sheet 54 or a belt 54. In FIG. 3A the coated abrasive article is a disc 52 and the specified z-direction rotational orientation positions the substantially planar surface 56 radically and the pattern created by the plurality of formed ceramic abrasive particles comprises a plurality of concentric circles. In FIG. 3B the coated abrasive article comprises a sheet 54 or a belt 54 and the specified z-direction rotational orientation positions the substantially planar surface 56 at an angle of approximately 90 degrees to the longitudinal axis 50 of the belt or the sheet and the pattern created by the plurality of formed ceramic abrasive particles comprises a plurality of parallel lines. Referring to FIG. 3C, the precision apertured screen 58 for precisely placing and rotationally aligning the formed abrasive particles when making the disc in FIG. 3A is shown.

Figure 4C:
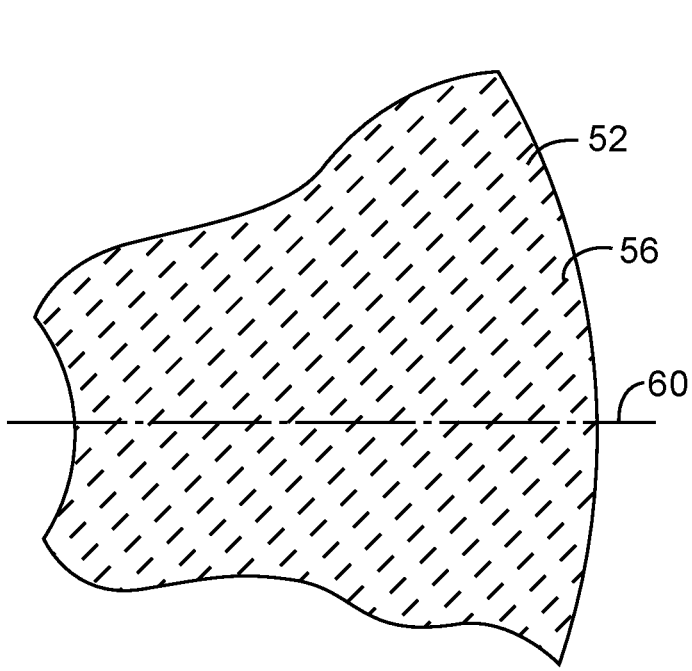
FIG. 4C is a top view of a portion of a screen having a plurality of rotationally aligned apertures used to make the coated abrasive articles of FIG. 4A.
Figure 4C:
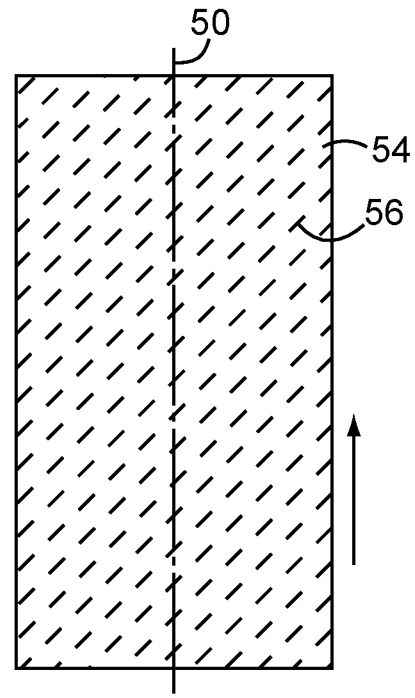
Figure 4C:
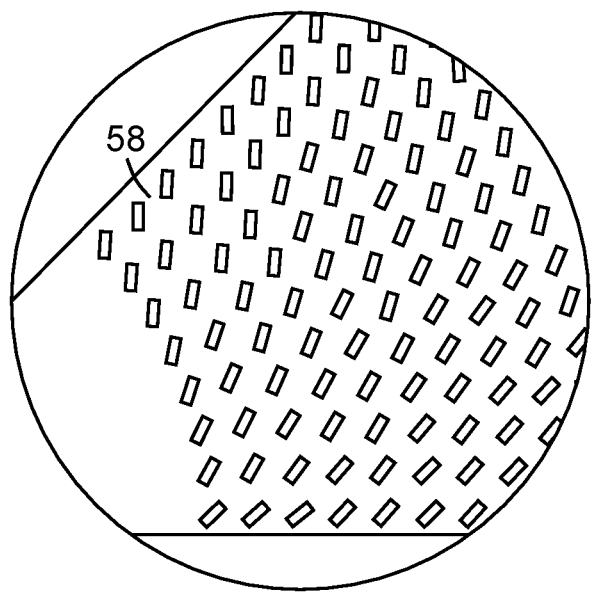

Referring now to FIGS. 4A, 4B, the coated abrasive article can comprise a disc 52 or a sheet 54 or a belt 54. In FIG. 4A the coated abrasive article is a disc 52 and the specified z-direction rotational orientation positions the substantially planar surface 56 at an angle of approximately 45 degrees to a diameter 60 of the disc and the pattern created by the plurality of formed ceramic abrasive particles comprises a plurality of parallel lines. In FIG. 4B the coated abrasive article is a sheet 54 or a belt 54 and the specified z-direction rotational orientation positions the substantially planar surface 56 at an angle of approximately 45 degrees to the longitudinal axis 50 of the belt or the sheet and the pattern created by the plurality of formed ceramic abrasive particles comprises a plurality of parallel lines. Referring to FIG. 4C, the precision apertured screen 58 for precisely placing and rotationally aligning the formed abrasive particles when making the disc in FIG. 4A is shown. In other embodiments, the substantially planar surface can be positioned at any angle between 0 degrees and 90 degrees such as 5, 10, 20, 25, 30, 35, 40, 45, 50, 55, 60, 65, 70, 75, 80, and 85 degrees. Ranges of the foregoing angular rotations are possible by selecting any two of the listed values to create and an upper and a lower limit.

Figure 5C:
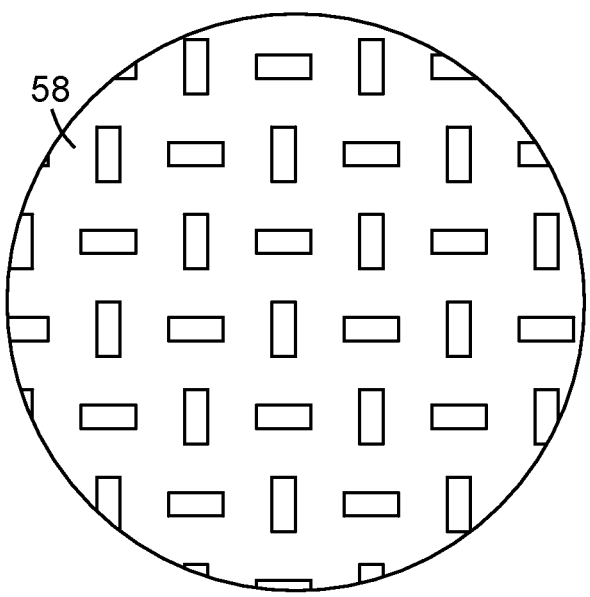
FIG. 5C is a top view of a portion of a screen having a plurality of rotationally aligned apertures used to make the coated abrasive articles of FIG. 5A.

Referring now to FIGS. 5A, 5B, the coated abrasive article can comprise a disc 52 or a sheet 54 or a belt 54. In FIG. 5A the coated abrasive article is a disc 52 and the specified z-direction rotational orientation positions approximately 50 percent of the formed abrasive particles having the substantially planar surface 56 aligned at approximately 0 degrees and approximately 50 percent of the formed abrasive particles having the substantially planar surface 56 aligned at an angle of approximately 90 degrees and the pattern created by the plurality of formed ceramic abrasive particles comprises a plurality of orthogonal lines. In FIG. 5B the coated abrasive article is a sheet 54 or a belt 54 and the specified z-direction rotational orientation positions approximately 50 percent of the formed abrasive particles having the substantially planar surface 56 aligned at approximately 0 degrees to the longitudinal axis 50 and approximately 50 percent of the formed abrasive particles having the substantially planar surface 56 aligned at an angle of approximately 90 degrees to the longitudinal axis 50 and a pattern created by the plurality of formed ceramic abrasive particles comprises a plurality of orthogonal lines. Referring to FIG. 5C, the precision apertured screen 58 for precisely placing and rotationally aligning the formed abrasive particles when making the disc in FIG. 5A is shown.

The make coat 44 and size coat 46 comprise a resinous adhesive. The resinous adhesive of the make coat 44 can be the same as or different from that of the size coat 46. Examples of resinous adhesives that are suitable for these coats include phenolic resins, epoxy resins, urea-formaldehyde resins, acrylate resins, aminoplast resins, melamine resins, acrylated epoxy resins, urethane resins and combinations thereof. In addition to the resinous adhesive, the make coat 44 or size coat 46, or both coats, may further comprise additives that are known in the art, such as, for example, fillers, grinding aids, wetting agents, surfactants, dyes, pigments, coupling agents, adhesion promoters, and combinations thereof. Examples of fillers include calcium carbonate, silica, talc, clay, calcium metasilicate, dolomite, aluminum sulfate and combinations thereof.

Suitable flexible backings include polymeric films, metal foils, woven fabrics, knitted fabrics, paper, vulcanized fiber, nonwovens, foams, screens, laminates, and combinations thereof. The coated abrasive article with a flexible backing may be in the form of sheets, discs, belts, pads, or rolls. In some embodiments, the backing should be sufficiently flexible to allow the coated abrasive article to be formed into a loop to make an abrasive belt that can be run on suitable grinding equipment.

A grinding aid can be applied to the coated abrasive article. A grinding aid is defined as particulate material, the addition of which has a significant effect on the chemical and physical processes of abrading, thereby resulting in improved performance. Grinding aids encompass a wide variety of different materials and can be inorganic or organic. Examples of chemical groups of grinding aids include waxes, organic halide compounds, halide salts, and metals and their alloys. The organic halide compounds will typically break down during abrading and release a halogen acid or a gaseous halide compound. Examples of such materials include chlorinated waxes, such as tetrachloronaphthalene, pentachloronaphthalene; and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, magnesium chloride. Examples of metals include tin, lead, bismuth, cobalt, antimony, cadmium, iron, and titanium. Other grinding aids include sulfur, organic sulfur compounds, graphite, and metallic sulfides. It is also within the scope of this invention to use a combination of different grinding aids; in some instances, this may produce a synergistic effect. In one embodiment, the grinding aid was cryolite or potassium tetrafluoroborate. The amount of such additives can be adjusted to give desired properties.

It is also within the scope of this invention to utilize a supersize coating over the size coating. The supersize coating typically contains a binder and a grinding aid. The binders can be formed from such materials as phenolic resins, acrylate resins, epoxy resins, urea-formaldehyde resins, melamine resins, urethane resins, and combinations thereof.

Figure 8:
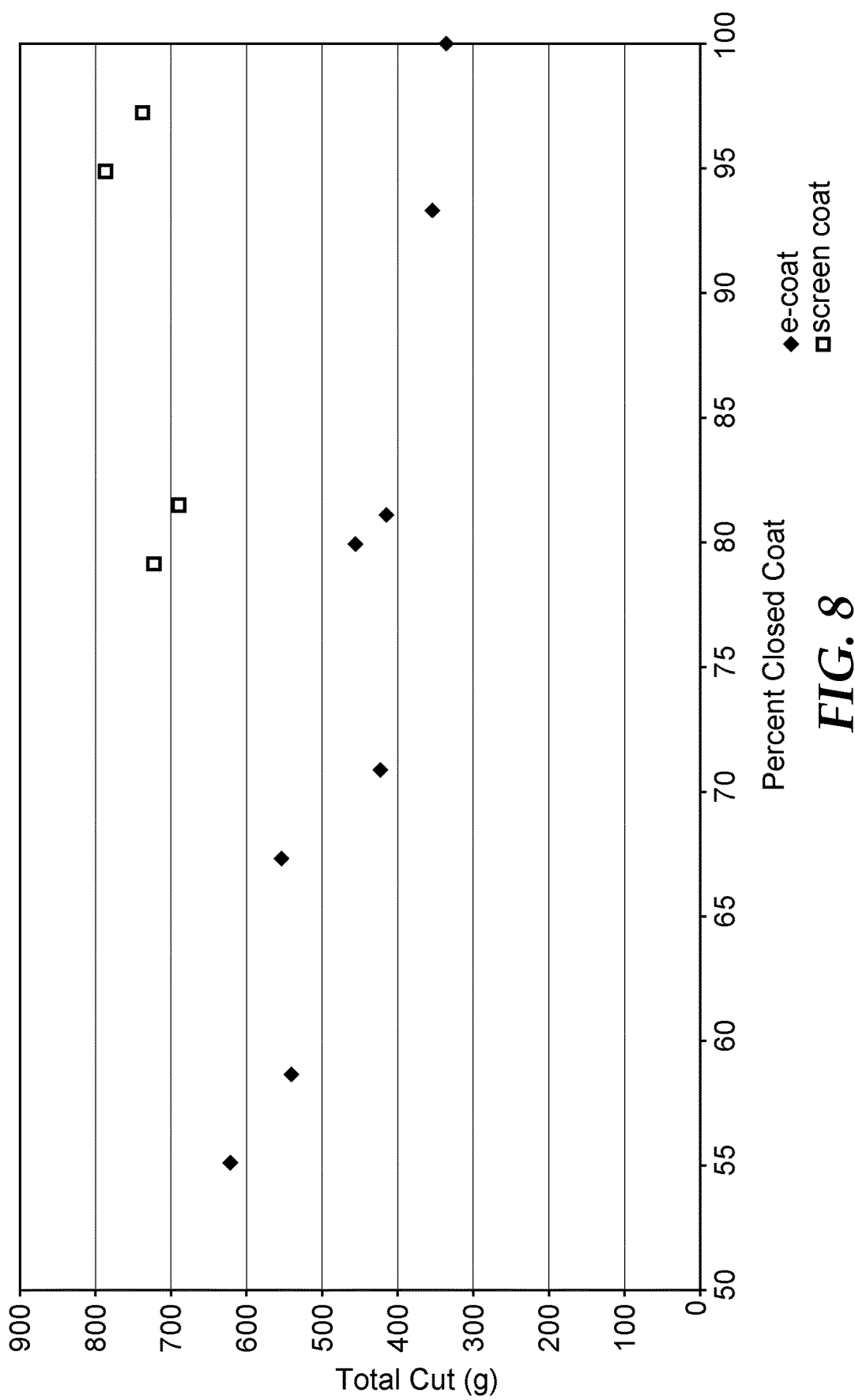
FIG. 8 is a graph of cut versus percent of closed coat density for two different methods of forming a coated abrasive article.

Methods of Making Coated Abrasive Articles Having Z-Direction Rotationally Aligned Abrasive Particles Various methods can be used to make the coated abrasive articles of the present disclosure. In one embodiment, an electrostatic coating method can be employed as described in copending patent application having U.S. patent application Ser. No. 61/443,399 filed on Feb. 16, 2011 entitled "Electrostatic Abrasive Particle Coating Apparatus and Method." In this particular method, an electrostatically charged vibratory feeder can be used to propel formed abrasive particles off of a feeding surface towards a conductive member located behind the coated backing. In some embodiments, the feeding surface is substantially horizontal and the coated backing is traveling substantially vertically. It was surprisingly found that varying the gap between the feeding surface and the conductive member in contact with the backing changes the z-direction rotational orientation of formed abrasive particles comprising thin triangular plates from predominately cross machine direction aligned plates to predominately machine direction aligned plates as seen in FIGS. 8 and 9 of the patent application.

Another method of achieving z-direction rotational orientation of formed abrasive particles can use precision apertured screens that position the formed abrasive particle into a specific z-direction rotational orientation such that the formed abrasive particle can only fit into the precision apertured screen in a few specific orientations such as less than or equal to 4, 3, 2, or 1 orientations. For example, a rectangular opening just slightly bigger than the cross section of a formed abrasive particle comprising a rectangular plate will orient the formed abrasive particle in one of two possible 180 degree opposed z-direction rotational orientations. The precision apertured screen can be designed such that the formed abrasive particles, while positioned in the screen's apertures, can rotate about their z-axis (normal to the screen's surface when the formed abrasive particles are positioned in the aperture) less than or equal to about 30, 20, 10, 5, 2, or 1 angular degrees.

The precision apertured screen having a plurality of apertures selected to z-directionally orient formed abrasive particles into a pattern, can have a retaining member such as adhesive tape on a second precision apertured screen with a matching aperture pattern, an electrostatic field used to hold the particles in the first precision screen or a mechanical lock such as two precision apertured screens with matching aperture patterns twisted in opposite directions to pinch the particles within the apertures. The first precision aperture screen is filled with the formed abrasive particles, and the retaining member is used to hold the formed abrasive particles in place in the apertures. In one embodiment, adhesive tape on the surface of a second precision aperture screen aligned in a stack with the first precision aperture screen causes the formed abrasive particles to stay in the apertures of the first precision screen stuck to the surface of the tape exposed in the second precision aperture screen's apertures.

A coated backing having a make layer is positioned parallel to the first precision aperture screen surface containing the plurality of formed abrasive particles with the make layer facing the formed abrasive particles in the apertures. Thereafter, the coated backing and the first precision aperture screen are brought into contact to adhere the formed abrasive particles to the make layer. The retaining member is released such as removing the second precision aperture screen with taped surface, untwisting the two precision aperture screens, or eliminating the electrostatic field. Then the first precision aperture screen is then removed leaving the formed abrasive particles having a specified z-directional rotational orientation on the coated abrasive article for further conventional processing such as applying a size coat and curing the make and size coats.

EXAMPLES

Objects and advantages of this disclosure are further illustrated by the following non-limiting examples. The particular materials and amounts thereof recited in these examples as well as other conditions and details, should not be construed to unduly limit this disclosure. Unless otherwise noted, all parts, percentages, ratios, etc. in the Examples and the rest of the specification are by weight.

Examples 1-4

Shaped abrasive particles were prepared according to the disclosure of U.S. patent publication 2010/0151196. The shaped abrasive particles were prepared by molding alumina sol gel in equilateral triangle-shaped polypropylene mold cavities of side length 0.068 inch (1.73 mm) and a mold depth of 0.012 inch (0.3 mm). After drying and firing, the resulting shaped abrasive particles resembled FIG. 1A except the draft angle α was approximately 98 degrees. The fired shaped abrasive particles were about 0.8 mm (side length)×0.2 mm thick and would pass through a 30-mesh sieve.

Eight inch diameter by 10 mil thick (20.3 cm×0.254 mm) circular precision apertured metal screens were obtained from Fotofab Inc., Chicago IL. The precision aperture screens were produced by photolithographic chemical etching. The individual apertures were etched from rectangular lithographic features. Due to the etching process, the actual features had rounded corners and the apertures were larger on the front and back surfaces than at the center of the sheet. The maximum surface dimension of each aperture was approximately 0.39 mm wide by 0.8 mm long. The dimension at the narrowest portion of each aperture was approximately 0.34 mm wide by 0.7 mm long.

Four different screen patterns were produced, each having the same density of apertures. The first screen, FIG. 3C (Example 1), had concentric rings of apertures where the long dimension of each aperture was oriented radially with respect to the circular precision aperture screen. The second screen, FIG. 2C (Example 2), had concentric rings of apertures where the long dimension of each aperture was oriented circumferentially with respect to the circular precision aperture screen. In the third screen, FIG. 4C (Example 3), the apertures were in concentric rings with the apertures oriented at an angle halfway between the first two screens, i.e. with a 45 degree offset from either the radial or the circumferential orientation. The fourth screen, FIG. 5C (Example 4), was made with apertures on a rectangular array with a repeat pattern altering vertical and horizontal apertures in each row with succeeding rows offset relative to each other such that each horizontal aperture is surrounded by four vertical apertures and each vertical aperture is surrounded by four horizontal apertures excepting at the screen's outer circular edge where the pattern may be cut off.

In order to properly restrain and orient the shaped abrasive particles in the screen apertures, it was necessary to stack two precision aperture screens on top of each other with all of the apertures aligned. The two identical precision aperture screens were held in alignment and secured with small tabs of foil tape at the screen's edges. One face of one screen of the indexed screen stack was then covered with masking tape ("SCOTCH 233+", 5 ¾ inch width, 3M Co. St Paul, MN). The indexed screen stack was now ready to receive shaped abrasive particles.

The dimensions of the shaped abrasive particles were such that only the vertex of a triangular plate would fit into the screen aperture, and only when it was oriented parallel to the long axis of the aperture can the vertex of the shaped abrasive particle contact the adhesive surface of the tape at the bottom of the aperture on the bottom screen.

A quantity of the shaped abrasive particles was applied to the surface of the indexed screen stack opposite the tape covered bottom screen surface and the indexed screen stack was gently tapped from the bottom. The indexed apertures were soon filled with shaped abrasive particles held vertex down and base up and oriented in the direction of the aperture's long dimension. Additional shaped abrasive particles were applied in this manner until greater than 90 percent of the apertures contained shaped abrasive particles that were secured by the exposed masking tape adhesive at their apexes.

A make resin was prepared by mixing 22.3 parts epoxy resin ("HELOXY 48", Hexion Specialty Chemicals, Houston, TX), 6.2 parts acrylate monomer("TMPTA", UCB Radcure, Savannah, GA) and adding 1.2 parts photoinitiator ("IRGACURE 651", Ciba Specialty Chemicals, Hawthorne, NY) with heating until the photoinitiator was dissolved. 51 parts resole phenolic resin (based-catalyzed condensate from 1.5:1 to 2.1:1 molar ratio of phenol:formaldehyde), 73 parts calcium carbonate (HUBERCARB, Huber Engineered Materials, Quincy, IL) and 8 parts water were added with mixing. 4.5 grams of this mixture was then applied via a brush to a 7 in (17.8 cm) diameter×0.83 mm thick vulcanized fiber web ("DYNOS Vulcanized Fibre", DYNOS GmbH, Troisdorf, Germany) having a 0.875 in (2.22 cm) center hole. The coated abrasive disc was then passed under a UV lamp at 20 ft/min (6.1 m/min) to gel the coating.

The foil tape tabs connecting the two precision aperture screens were removed from the shaped abrasive particle filled indexed screen stack. The shaped abrasive particles themselves in the apertures were sufficient to index the two screens. The make resin-coated fiber disc was placed make resin side up on a flat surface. The shaped abrasive particle filled indexed screen stack was centered on the fiber disc and the mineral-loaded face was placed in contact with the make resin. While holding the assembly stationary, the top precision aperture screen having the taped surface was carefully separated from the bottom precision aperture screen containing the shaped abrasive particles, releasing the shaped abrasive particles. The bottom precision aperture screen was then carefully lifted from the make resin surface of the fiber disc. This resulted in the shaped abrasive particles being transferred to make resin with their vertexes up while largely maintaining the z-direction rotational orientation established by the screen's apertures. The weight of the shaped abrasive particles transferred to each disc was 3.5 grams. The make resin was thermally cured (90 degrees C. for 90 minutes followed by 105 degrees C. for 3 hours). Each disc was then coated with a conventional cryolite-containing phenolic size resin and cured (90 degrees C. for 90 minutes followed by 16 hours at 105 degrees C.).

The finished coated abrasive discs were allowed to equilibrate at ambient humidity for a week followed by 2 days at 50% RH before testing.

Comparative Example A

Comparative Example A was prepared identically to Examples 1-4 except that the shaped abrasive particles were applied via electrostatic coating and were therefore had a random z-direction rotational orientation.

Grinding Test Method

The grinding performance of the various discs was evaluated by grinding 1018 mild carbon steel using the following procedure. Seven inch (17.8 cm) diameter abrasive discs for evaluation were attached to a rotary grinder fitted with a 7-inch (17.8 cm) smooth disc pad face plate ("821197 Hard Black" obtained from 3M Company, St. Paul, Minnesota). The grinder was then activated and urged against an end face of a 0.75×0.75 in (1.9×1.9 cm) pre-weighed 1018 steel bar under a load of 12 lb (5.4 kg). The resulting rotational speed of the grinder under this load and against this workpiece was 5000 rpm. The workpiece was abraded under these conditions for 10-second grinding intervals (passes). Following each 10-second interval, the workpiece was allowed to cool to room temperature and weighed to determine the cut of the abrasive operation. Test results were reported as the incremental cut for each interval and the total cut removed. The test end point was determined when the cut fell below 20% of the initial cut value. The test was repeated for all Examples at an 8-lb (3.6 kg) load. If desired, the testing can be automated using suitable equipment.

TABLE 1

Grinding Results

| Test load | 8 lbs | | | | | 12 lbs | | | | |
|---|---|---|---|---|---|---|---|---|---|---|
| Cut cycle | Example 1 | Example 2. | Example 3 | Comp. Ex. A | Comp. Ex. A | Example 1 | Example 2 | Example 3 | Example 4 | Comp. Ex A |
| 1 | 6.86 | 19.28 | 15.77 | 22.34 | 20.56 | 6.2 | 23.45 | 8.85 | 26.64 | 33.63 |
| 2 | 3.22 | 23.3 | 9.1 | 17.45 | 23.29 | 1.7 | 7.87 | 4.03 | 6.84 | 26.51 |
| 3 | 2.27 | 19.64 | 7.62 | 11.29 | 18.6 | 1.14 | 4.94 | 3.05 | 4.09 | 10.08 |
| 4 | 2.05 | 13.39 | 5.55 | 7.72 | 11.39 | | 3.92 | 2.38 | | 6.12 |
| 5 | 1.82 | 9.1 | 4.5 | 6.81 | 8.24 | | | 2.1 | | |
| 6 | 1.63 | 6.58 | 4.06 | 5.79 | 6.43 | | | 1.97 | | |
| 7 | 1.35 | 6.18 | 3.62 | 5.36 | 5.23 | | | 1.71 | | |
| 8 | | 5.81 | 3.52 | 4.55 | 4.58 | | | | | |
| 9 | | 5.34 | 3.41 | 3.94 | 4.15 | | | | | |
| 10 | | 5.02 | 3.3 | | 3.88 | | | | | |
| 11 | | 4.32 | 2.99 | | | | | | | |
| 12 | | 3.9 | | | | | | | | |
| 13 | | 3.77 | | | | | | | | |
| Total | 19.2 | 125.63 | 63.44 | 85.25 | 106.35 | 9.04 | 40.18 | 24.09 | 37.57 | 76.34 |

Figure 6:
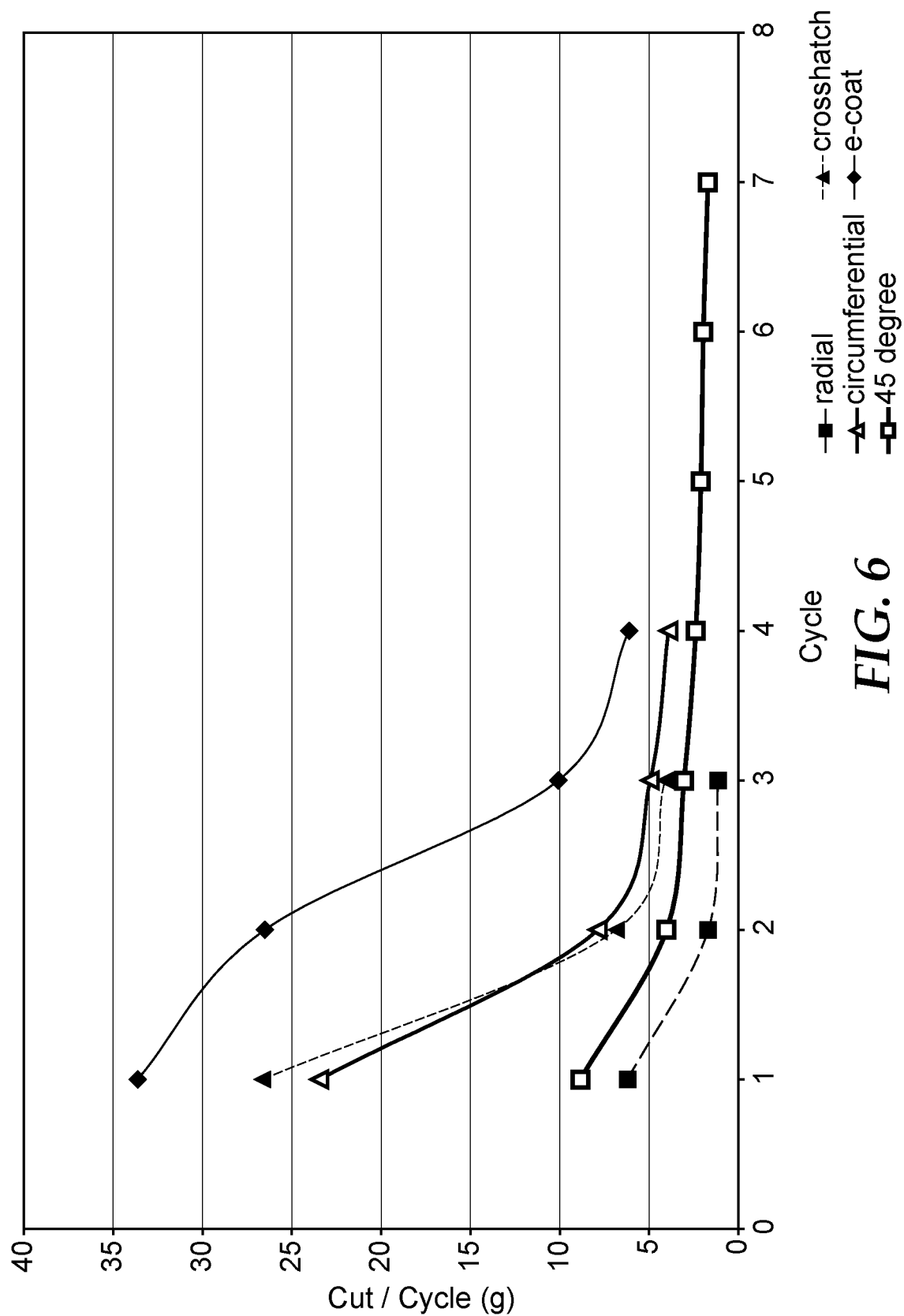
FIGS. 6 and 7 are graphs of the grinding performance of various Examples of the invention.
Figure 7:
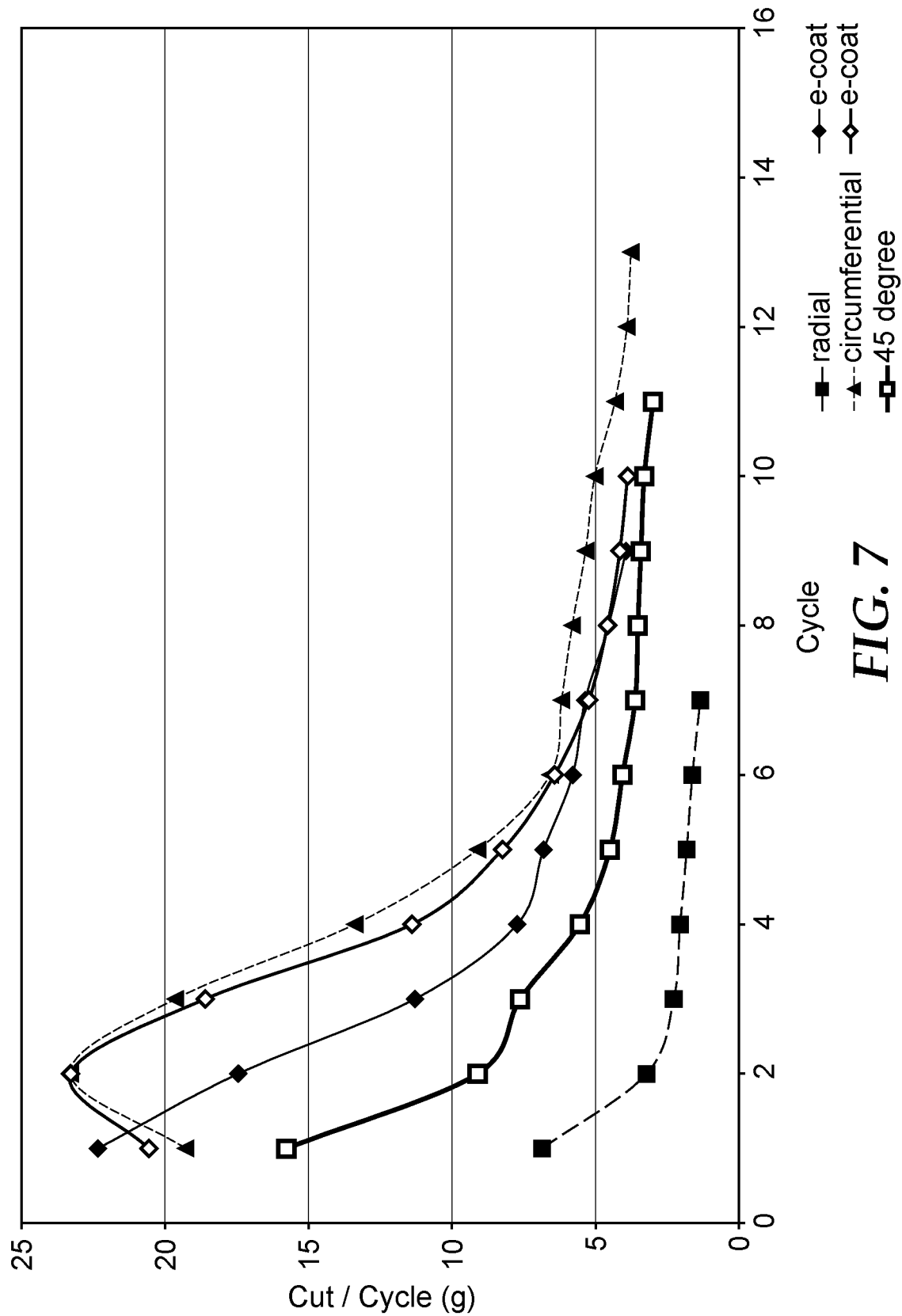

Test results are shown in Table 1. FIG. 6 plots the cut results for various Example disks and the e-coated Control disc under a 12 lb load and FIG. 7 plots the cut results for various Example disks and the e-coated Control discs under the 8 pound load. As seen, varying the z-direction rotational orientation of the substantially planar surface significantly affected the cut rate of the various Example discs.

Example 5

In Example 5, apertured screens were used to control the vertex up orientation of triangular shaped abrasive particles in screen coated abrasive discs and compared to electrostatically coated (e-coated) Control abrasive discs for total cut on stainless steel. The weight of the triangular shaped abrasive particles placed into the apertured screen was varied and compared to e-coated control discs of the triangular shaped abrasive particles of various weights. In this example a simple 28 mesh woven wire sieve screen was used to align the triangular shaped abrasive particles in the proper vertex up orientation. The triangular shaped particles were prepared by shaping alumina sol gel from equilateral, triangular-shaped polypropylene mold cavities of side length 110 mils, a mold depth of 28 mils, and a 98 degree draft angle. After drying and firing, the resulting triangular shaped abrasive particles had a side length of about 0.110" (2.8 mm), a thickness of about 0.012" (0.3 mm), and a −20+26 mesh sieve size.

For these screen coated abrasive discs, the rotational alignment of the triangular shaped abrasive particles was not controlled, and the screen's apertures allowed for a random z-direction rotational orientation. However, the apertured screens assured that approximately 100 percent of the triangular shaped abrasive grain in the abrasive layer had its vertex pointing away from the backing. As the percent closed coat density is increased for the e-coated samples, more and more of the triangular shaped abrasive particles become attached in the abrasive layer by their vertex thereby presenting a horizontal surface to the workpiece to be abraded. As seen in FIG. 8, the screen coated discs had significantly higher cut at percent closed coat densities greater than 75 percent. In various embodiments of the invention, screen coated discs can have a percent closed coat density from about 75 to about 100 percent, or from about 80 to about 98 percent. At these densities, significantly more shaped abrasive particles comprising triangular plates are attached to the make layer by the triangle's base with the vertex pointing away from the make layer significantly enhancing the total cut of the coated abrasive article.

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A coated abrasive article comprising:
   a plurality of monolithic formed ceramic abrasive particles each comprising a sidewall and a first face having a substantially planar surface; and
   a backing;
   wherein the plurality of monolithic formed ceramic abrasive particles are attached to the backing by their sidewall and at least 50% of the monolithic formed ceramic abrasive particles are oriented with the substantially planar surface of each such monolithic formed ceramic abrasive particle at a predetermined z-direction rotational orientation, wherein the predetermined z-direction rotational orientation of each of the monolithic formed ceramic abrasive particles is about a z-axis passing through the monolithic formed ceramic abrasive particle and through the backing at a 90 degree angle to the backing.

2. The coated abrasive article of claim 1, wherein the z-direction rotational orientation is not random and occurs more frequently than would occur by a random z-direction rotational orientation of the plurality of monolithic formed ceramic abrasive particles.

3. The coated abrasive article of claim 1, wherein the predetermined z-direction rotational orientation of at least 50 percent of the monolithic formed ceramic abrasive particles is at an angle ranging from approximately zero degrees to approximately 90 degrees relative to a longitudinal axis of the article.

4. The coated abrasive article of claim 1, wherein the plurality of monolithic formed ceramic abrasive particles are attached to the backing by a make coat comprising a resinous adhesive.

5. The coated abrasive article of claim 1, wherein the backing is a flexible backing.

6. The coated abrasive article of claim 1, further comprising a size coat applied over the plurality of monolithic formed ceramic abrasive particles attached to the backing.

7. The coated abrasive article of claim 1, wherein the coated abrasive article comprises a disc and the predetermined z-direction rotational orientation positions the plurality of monolithic formed ceramic abrasive particles circumferentially and a pattern created by the plurality of monolithic formed ceramic abrasive particles comprises a plurality of concentric circles.

8. The coated abrasive article of claim 1, wherein the coated abrasive article comprises a sheet or a belt and the predetermined z-direction rotational orientation positions the plurality of monolithic formed ceramic abrasive particles at an angle of approximately 0 degrees to a longitudinal axis of the belt or the sheet and a pattern created by the plurality of monolithic formed ceramic abrasive particles comprises a plurality of parallel lines.

9. The coated abrasive article of claim 1, wherein the coated abrasive article comprises a disc and the predetermined z-direction rotational orientation positions the plurality of monolithic formed ceramic abrasive particles radially and a pattern created by the plurality of monolithic formed ceramic abrasive particles comprises a plurality of concentric circles.

10. The coated abrasive article of claim 1, wherein at least 80% of the monolithic formed ceramic abrasive particles have the specified z-direction rotational orientation.

11. The coated abrasive article of claim 1, wherein the monolithic formed ceramic abrasive particles comprise plates having two opposed substantially planar surfaces.

12. The coated abrasive article of claim 11, wherein the opposed substantially planar surfaces each have a triangular perimeter.

13. The coated abrasive article of claim 1, wherein the plurality of formed ceramic abrasive particles each comprise at least one surface feature that is chosen from:
    a concave surface;
    a convex surface;
    a vertex;
    an aperture;
    a ridge;
    a line or a plurality of lines;
    a protrusion; and
    a depression.

14. The coated abrasive article of claim 1, wherein 100 percent of the monolithic formed ceramic abrasive particles are oriented at the predetermined z-direction rotational orientation.

15. A method of forming a coated abrasive article, the method comprising:
    disposing a plurality of monolithic formed ceramic abrasive particles, each comprising a sidewall and a first face having a substantially planar surface, in a plurality of apertures of a screen, at least 50% of the plurality of monolithic formed ceramic abrasive particles are oriented such that the substantially planar surface of each such monolithic formed ceramic abrasive particle is rotated about a z-axis passing thorough each of the apertures and monolithic formed ceramic abrasive particles to a predetermined z-directional orientation;
    contacting the screen with a coated backing; and
    releasing the plurality of monolithic formed ceramic abrasive particles to the backing,
    wherein a predetermined rotational direction of the monolithic formed ceramic abrasive particles about the z-axis passing through each particle and the backing is substantially the same as the predetermined z-directional orientation of the formed ceramic abrasive particles in the apertures, wherein the predetermined z-direction rotational orientation of each of the monolithic formed ceramic abrasive particles is about a z-axis passing through the monolithic formed ceramic abrasive particle and through the backing at a 90 degree angle to the backing.

16. The method of claim 15 wherein each of the apertures has a profile defined by a shape chosen from a circle, a triangle, a square, a rectangle, a pentagon, a hexagon, a heptagon, an octagon, a nonagon, or a decagon.

17. The method of claim 15, wherein a largest dimension of an aperture is larger than a largest dimension of the monolithic formed ceramic abrasive particle disposed therein.

18. The method of claim 15, further comprising a retaining member attached to the screen and the plurality of monolithic formed ceramic abrasive particles.

19. The method of claim 18, further comprising removing the retaining member after the screen is contacted with the coated backing.

20. The method of claim 15, wherein the method is free of at least one of electrostatic coating and drop coating.

* * * * *